US011679732B2

(12) United States Patent
Matijevich et al.

(10) Patent No.: US 11,679,732 B2
(45) Date of Patent: Jun. 20, 2023

(54) DRIVER BARRIER (71) Applicants: Mark Matijevich, Chino, CA (US);
Tony Matijevich, Chino, CA (US)

(72) Inventors: Mark Matijevich, Chino, CA (US);
Tony Matijevich, Chino, CA (US)

(*) Notice: Subject to any disclaimer, the term of this patent is extended or adjusted under 35 U.S.C. 154(b) by 22 days.

(21) Appl. No.: 17/338,251

(22) Filed: Jun. 3, 2021

(65) Prior Publication Data
US 2021/0380062 A1 Dec. 9, 2021

Related U.S. Application Data (60) Provisional application No. 63/034,917, filed on Jun. 4, 2020.

(51) Int. Cl.
B60R 21/12 (2006.01)
B60R 21/02 (2006.01)
B60R 21/00 (2006.01)

(52) U.S. Cl.
CPC ............ B60R 21/12 (2013.01); B60R 21/026 (2013.01); *B60R 2021/0067* (2013.01)

(58) Field of Classification Search
CPC ................. B60R 21/12; B60R 21/026; B60R 2021/0067
See application file for complete search history.

(56) References Cited

U.S. PATENT DOCUMENTS 4,227,735 A * 10/1980 Joyner ................... B60R 21/12
109/9
5,069,497 A * 12/1991 Clelland ............... B60R 21/026
52/207
7,032,946 B1 * 4/2006 Brown .................... B60R 21/12
49/54
(Continued)

FOREIGN PATENT DOCUMENTS

EP 2428411 A1 * 3/2012 ............... B60J 1/16
KR 0122224 Y1 * 10/1998
KR 0128476 Y1 * 12/1998
(Continued)

OTHER PUBLICATIONS

Machine Translation of EP-2428411-A1 (Year: 2012).*
Machine Translation of WO-2012062246-A1 (Year: 2012).*

Primary Examiner — Paul N Dickson
Assistant Examiner — Kurtis Nielson
(74) Attorney, Agent, or Firm — Rutan & Tucker LLP; Hani Z. Sayed (57) ABSTRACT An apparatus and methods for a driver barrier to isolate public transit vehicle operators, such as bus drivers or coach operators, from passenger seating areas. The driver side barrier includes a driver side barrier mounted behind a driver cockpit and a door coupled with the driver side barrier. In a closed configuration, the driver side barrier and door provide a barrier between the driver cockpit and a passenger seating area of the vehicle. The door may be rotated forward to provide a protective shield around the driver cockpit while allowing passengers to enter and exit the passenger seating area. In some embodiments, the door may be extended across an aisle of the passenger seating area to a curbside barrier, thereby partitioning the driver cockpit and passenger seating areas. When not in use, the door may be stowed behind the driver cockpit.

17 Claims, 4 Drawing Sheets (56) References Cited

U.S. PATENT DOCUMENTS

2014/0210225 A1* 7/2014 Manzke, Jr. .......... B60R 21/026
                                                            296/24.4
2017/0327070 A1* 11/2017 Schmidt ................. B60R 21/12

FOREIGN PATENT DOCUMENTS

| KR | 200420427 Y1 * | 7/2006 | |
|---|---|---|---|
| KR | 20060106984 A * | 10/2006 | |
| WO | WO-8502539 A1 * | 6/1985 | |
| WO | WO-2011124950 A1 * | 10/2011 | ............. B60R 21/12 |
| WO | WO-2012062246 A1 * | 5/2012 | ................ B60J 1/16 |

* cited by examiner

DRIVER BARRIER

PRIORITY

This application claims the benefit of and priority to U.S. Provisional application, entitled "Driver Barrier," filed on Jun. 4, 2020 and having application Ser. No. 63/034,917, the entirety of said application being incorporated herein by reference.

FIELD

Embodiments of the present disclosure generally relate to the field of security devices. More specifically, embodiments of the disclosure relate to driver barriers and methods for isolating public transit vehicle operators, such as bus drivers or coach operators, from passengers of such vehicles.

BACKGROUND

Partitions generally are used to separate the front and rear occupant areas of vehicles, such as police cars and taxi cabs, so as to prevent access to the front seat by passengers located in the rear seat. Partitions may be used to shield the front occupant area from contagious diseases, such as Influenza and Covid-19, as well as providing a security barrier to prevent and/or discourage hijackers, burglars, rioters, and looters from accessing the front occupant area of the vehicle. Since police cars and taxi cabs typically transport one or two passengers, partitions in such vehicles generally comprise a protective barrier isolating the entire rear occupant area from the front occupant area of the vehicle.

Operators of mass transit vehicles, such as city buses and trains, are particularly vulnerable to criminal acts. Buses and trains generally comprise relatively small indoor spaces, includes tight seating, and may see upwards of a thousand people entering and exiting throughout each day. As such, public transit operators are placed at an increased risk of encountering a wide variety of dangerous passengers. Embodiments disclosed herein provide driver barriers and methods for isolating a public transit vehicle operator, such as a bus driver or a coach operator, from the passenger area of such vehicles.

SUMMARY

An apparatus and methods for a driver barrier to isolate public transit vehicle operators, such as bus drivers or coach operators, from passenger seating areas. The driver side barrier includes a driver side barrier mounted behind a driver cockpit and a door coupled with the driver side barrier. In a closed configuration, the driver side barrier and door provide a barrier between the driver cockpit and a passenger seating area of the vehicle. The door may be rotated forward to provide a protective shield around the driver cockpit while allowing passengers to enter and exit the passenger seating area. In some embodiments, the door may be extended across an aisle of the passenger seating area to a curbside barrier, thereby partitioning the driver cockpit and passenger seating areas. When not in use, the door may be stowed behind the driver cockpit.

In an exemplary embodiment, a driver barrier for isolating a public transit vehicle operator from a passenger seating area of a vehicle comprises: a driver side barrier and an opaque barrier mounted behind a driver cockpit of a public transit vehicle; and a door coupled with the driver side barrier and the opaque barrier for providing a barrier between the drive cockpit and the passenger seating area.

In another exemplary embodiment, the driver side barrier and the opaque barrier provide a protective shield between the public transit operator and the passenger seating area. In another exemplary embodiment, the driver side barrier enables the public transit operator to view the seating area as well as utilize a rearview mirror during operating the vehicle.

In another exemplary embodiment, the driver side barrier comprises an optically transparent material, such as acrylic, polycarbonate, or other optically transparent material. In another exemplary embodiment, the optically transparent material comprises a ⅜" thick polycarbonate panel. In another exemplary embodiment, the optically transparent material comprises a ¼" acrylic panel.

In another exemplary embodiment, the opaque barrier comprises a rigid material such as metal or hard plastic. In another exemplary embodiment, the barrier further comprises one or more stanchions that support the door and the driver side barrier and the opaque barrier. In another exemplary embodiment, the driver side barrier and the opaque barrier are fixedly coupled with the one or more stanchions. In another exemplary embodiment, the door is coupled with the one or more stanchions by way of hinges and sliders.

In another exemplary embodiment, the hinges enable the door to rotate between an aisle configuration and a closed configuration that separates the driver cockpit from the passenger seating area. In another exemplary embodiment, the aisle configuration of the door operates as a protective shield that separates the driver cockpit from an entryway of the public transit vehicle while passengers move into and out of the seating area and through the entryway. In another exemplary embodiment, the sliders enable the door to slide between the closed configuration and a stowed configuration wherein the door may be positioned adjacently to the driver side barrier and the opaque barrier so as to provide free access between the seating area and the driver cockpit and the entryway.

In another exemplary embodiment, the barrier further comprises a curbside stanchion mounted between a floor and a ceiling of the vehicle and supporting a curbside barrier that includes a fixed barrier and an opaque barrier fastened between the curbside stanchion and a curbside wall of the vehicle. In another exemplary embodiment, the door is mounted by way of sliders coupled with one or more stanchions that support the driver side barrier and the opaque barrier. In another exemplary embodiment, the sliders enable the door to slide between a closed configuration and an open configuration wherein the door may be positioned adjacently to the driver side barrier and the opaque barrier so as to provide free access between the seating area and the driver cockpit and an entryway of the vehicle. In another exemplary embodiment, the closed configuration comprises the door extending from the driver side barrier to the curbside barrier to provide a full-face protective shield between the driver cockpit and the entryway and the seating area.

In an exemplary embodiment, a method for providing a driver barrier to a public transit vehicle operator comprises: fastening a driver side barrier and an opaque barrier to one or more stanchions behind a driver cockpit of a public transit vehicle; mounting a first slider to the one or more stanchions at a top of the driver side barrier; mounting a second slider to the one or more stanchions at a bottom of the opaque barrier; configuring a door to extend from the driver side barrier and opaque barrier across an aisle of a passenger seating area comprising the public transit vehicle; and coupling the door with the first and second sliders by way of slide blocks fastened to a top and a bottom of the door.

In another exemplary embodiment, coupling includes coupling the slide blocks with hinges whereby the door may be rotated with respect to the first and second sliders, such that the door may be rotated between an aisle configuration and a closed configuration that separates the driver cockpit from the passenger seating area. In another exemplary embodiment, fastening includes mounting a curbside stanchion between a floor and a ceiling of the vehicle and supporting a curbside barrier that includes a fixed barrier and an opaque barrier fastened between the curbside stanchion and a curbside wall of the vehicle. In another exemplary embodiment, configuring the door includes configuring the door to slide between a closed configuration and an open configuration wherein the door may be positioned to provide free access between the seating area and an entryway of the vehicle.

These and other features of the concepts provided herein may be better understood with reference to the drawings, description, and appended claims.

BRIEF DESCRIPTION OF THE DRAWINGS

The drawings refer to embodiments of the present disclosure in which.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first panel," may be made. However, the specific numeric reference should not be interpreted as a literal sequential order but rather interpreted that the "first panel" is different than a "second panel." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Operators of mass transit vehicles, such as city buses and trains, are particularly vulnerable to criminal acts. Buses and trains generally comprise relatively small indoor spaces, includes tight seating, and may see upwards of a thousand people entering and exiting throughout each day. As such, public transit operators are placed at an increased risk of encountering a wide variety of dangerous passengers and situations. Partitions may be used to provide a security barrier to prevent and/or discourage hijackers, burglars, rioters, and looters within a passenger area of a bus or train from accessing an operator area of the vehicle. Embodiments disclosed herein provide driver barriers and methods for isolating public transit vehicle operators, such as bus drivers or coach operators, from the passenger area of such vehicles.

Figure 1:
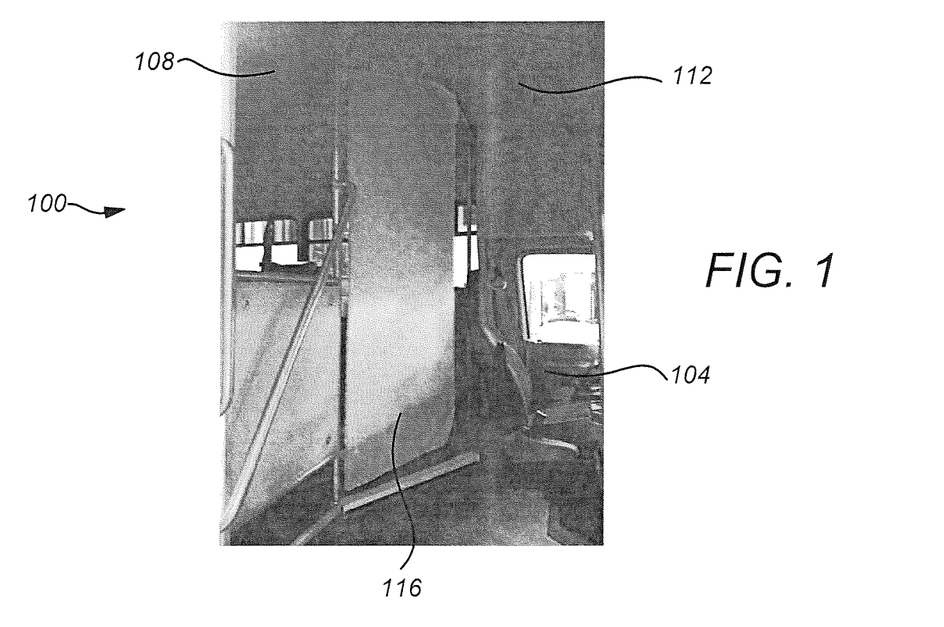
FIG. 1 illustrates an exemplary-use environment wherein an exemplary embodiment of a driver barrier is disposed between a driver cockpit and a seating area within an exemplary bus.

FIG. 1 illustrates an exemplary-use environment wherein a driver barrier 100 is disposed between a driver cockpit 104 and a seating area 108 within an exemplary bus 112. The driver barrier 100 generally comprises a transparent door 116 that is mounted adjacent to the cockpit 104 such that a driver may open and close the door, as desired. The door 116 may be made of acrylic, polycarbonate, or any similar optically transparent material. In one embodiment, the door 116 comprises a ⅜" thick polycarbonate panel. In a closed configuration, shown in FIG. 1, the door 116 provides a barrier between the driver cockpit 104 and the seating area 108. It is contemplated that the closed configuration of the door 116 advantageously prevents passengers within the seating area 108 from accessing the driver cockpit 104, thereby protecting the driver from potential hijackers, burglars, rioters, looters, and the like. It is further contemplated that the closed configuration of the door 116 inhibits the transfer of airborne droplets and contagious aerosols arising within the seating area 108 from reaching the driver cockpit 104, thereby protecting the driver from infection.

Figure 2:
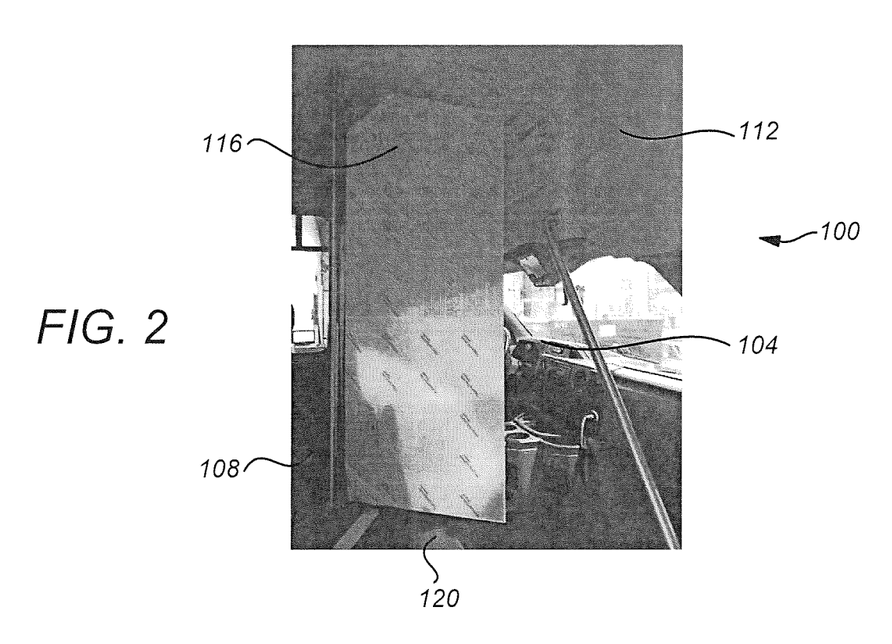
FIG. 2 illustrates an exemplary-use environment wherein the driver barrier of FIG. 1 is placed into an open configuration.

FIG. 2 illustrates an exemplary-use environment wherein the driver barrier 100 is placed into an open configuration. As will be appreciated, the driver may put the driver barrier 100 into the open configuration during loading and unloading passengers from the seating area 108. As shown in FIG. 2, in the open configuration, the door 116 provides a barrier that separates the driver cockpit 104 from an entryway 120 of the bus 112 and the seating area 108. Thus, the open configuration of the driver barrier 100 provides a protective shield for the driver while passengers move into and out of the seating area 108 and through the entryway 120. Once the passengers have finished moving through the entryway 120, the driver may close the door 116 to place the driver barrier 100 into the closed configuration shown in FIG. 1 before, again, operating the bus 112.

Figure 3A:
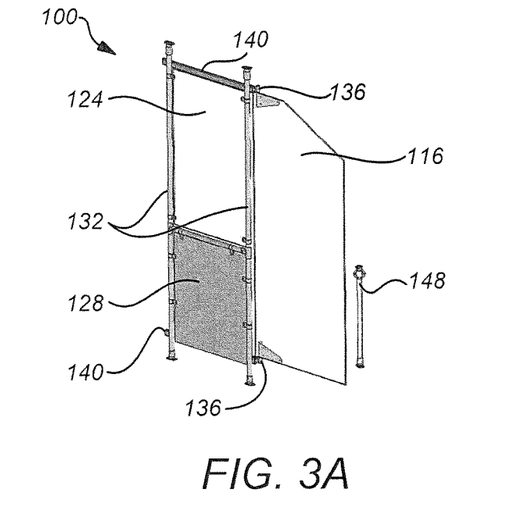
FIG. 3A illustrates an isometric view of an exemplary embodiment of a driver barrier in a closed configuration.
Figures 3B, 4:
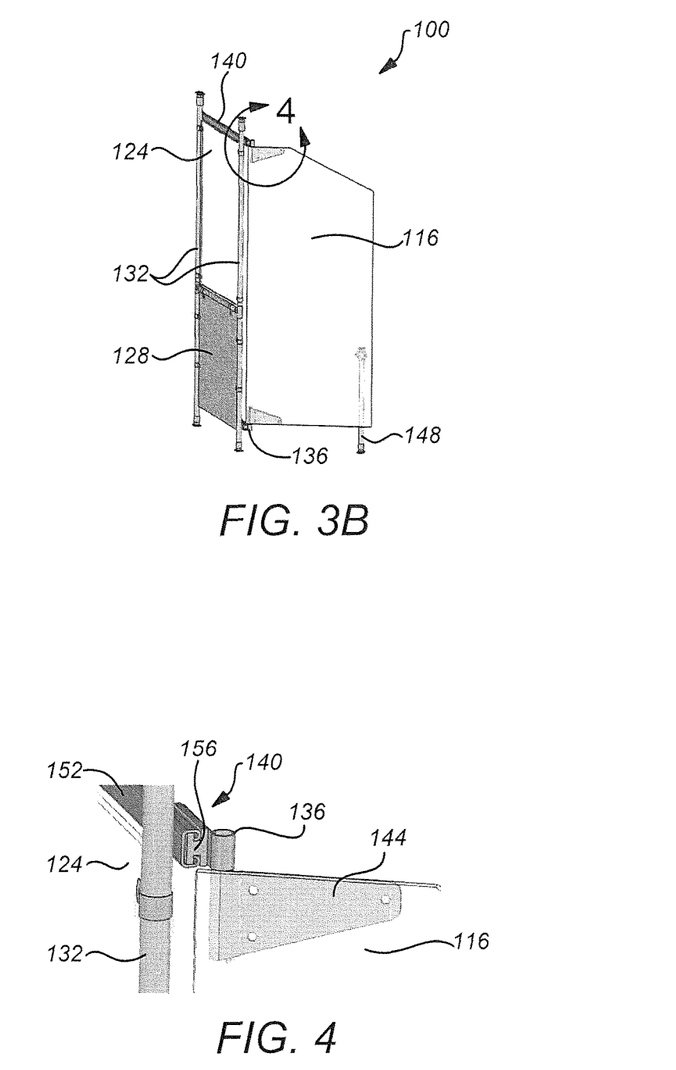
FIG. 3B illustrates an isometric view of the driver barrier of FIG. 3A in an open, aisle configuration.
FIG. 4 illustrates a close-up isometric view of a hinge and slider shown in FIG. 3B.
Figure 3C:
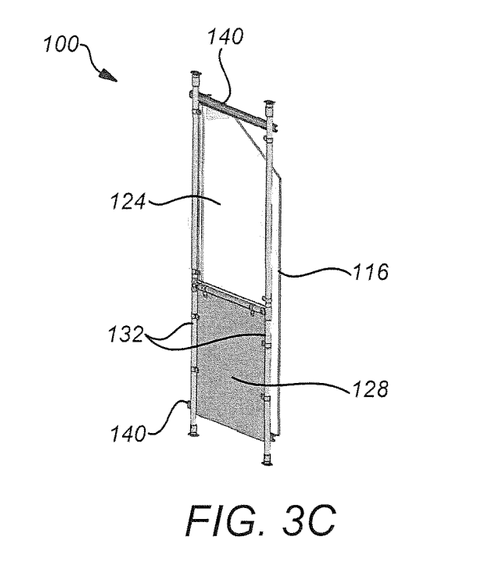
FIG. 3C illustrates an isometric view of the driver barrier of FIG. 3A in a stowed configuration.

FIGS. 3A-3C illustrate the driver barrier 100 of FIG. 1 in greater detail and placed into different useful configurations. FIG. 3A illustrates the driver barrier 100 in the closed configuration discussed with respect to FIG. 1. As best shown in FIG. 3A, the driver barrier 100 comprises the door 116 coupled with a fixed driver side barrier 124 and an opaque barrier 128. The driver side barrier 124 may be an optically transparent material, such as acrylic, polycarbonate, or other optically transparent material. Further, the driver side barrier 124 may be configured to prevent and/or discourage break-in attempts by occupants within the passenger seating area 108 that may use blunt-force instruments, such as sledgehammers, crowbars, knives, pickaxes, bricks, blocks, bats, and the like. In one embodiment, the driver side barrier 124 comprises a ⅜" thick polycarbonate panel. In another embodiment, the driver side barrier 124 comprises a ¼" acrylic panel. The opaque barrier 128 generally comprises a rigid material such as metal or hard plastic.

With continuing reference to FIGS. 3A-3C, the driver barrier 100 may comprise one or more stanchions that support the door 116 and the barriers 124, 128. In the illustrated embodiment, the driver side barrier 124 and the opaque barrier 128 are fixedly coupled with stanchions 132. Any of various suitable fasteners may be used to fasten the driver side barrier 124 and the opaque barrier 128 to the stanchions 132. In general, the barriers 124, 128 are mounted within the bus 112 behind the driver cockpit 104, and thus provide a protective shield between the seating area 108 and the driver. Further, the transparent material comprising the fixed driver side barrier 124 enables the driver to view the seating area 108 as well as utilize a rearview mirror during operating the bus 112.

The door 116 is coupled with the stanchions 132 by way of hinges 136 and sliders 140. As best shown in FIG. 4, each hinge 136 may be fastened onto the door 116 by way of a mount 144 configured to support the door 116 without cracking the transparent material comprising the door 116. As will be appreciated, the hinges 136 are configured to facilitate rotating the door 116 with respect to the stanchions 132. Thus, the driver may rotate the door 116 from the closed configuration of FIG. 3A to an open, aisle configuration shown in FIG. 3B. As described in connection with FIG. 2, the aisle configuration enables the driver to use the door 116 as a protective shield that separates the driver cockpit 104 from the entryway 120 of the bus 112 while passengers move into and out of the seating area 108 and through the entryway 120. In the embodiment shown in FIGS. 3A and 3B, the driver barrier 100 may further include a doorstop 148 configured to support door 116 in the aisle configuration. As will be appreciated, the aisle configuration of the door 116 cooperates with the barriers 124, 128 to isolate the driver from the seating area 108 and the entryway 120 during loading and unloading passengers. Once the passengers have finished moving through the entryway 120, the driver may rotate the door 116 into the closed configuration shown in FIG. 3A before resuming operation of the bus 112.

As shown in FIG. 3C, the sliders 140 are configured to facilitate placing the driver barrier 100 into a stowed configuration wherein the door 116 may be positioned adjacently to the barriers 124, 128. In the stowed configuration, the door 116 may be moved between the driver cockpit 104 and the barriers 124, 128, thereby providing free access between the driver cockpit 104, the seating area 108, and the entryway 120. As shown in FIG. 4, each slider 140 generally comprises a seat track 152 that receives a slide block 156. The seat track 152 may be comprised of stainless steel and configured to allow the slide block 156 to slide along a length of the seat track 152. As shown in FIG. 3C, the sliders 140 may be mounted horizontally between the stanchions 132, at a top of the driver side barrier 124 and at a bottom of the opaque barrier 128. During stowing the door 116, therefore, the driver may rotate the door 116 into the closed configuration shown in FIG. 3A, by way of the hinges 136, and then the driver may slide the door 116 into the stowed configuration shown in FIG. 3C, by way of the sliders 140.

It should be borne in mind that the embodiment of the driver barrier 100 illustrated in FIGS. 1-4 is exemplary in nature and thus is not limited to the specific variations shown and described hereinabove. As such, those of ordinary skill in the art will recognize that certain portions of the driver barrier 100 may be modified and that such modifications are in accordance with the variations of the invention. For example, the driver barrier 100 may be modified, without limitation, depending on the particular vehicle into which the driver barrier 100 is intended to be installed.

Figure 5:
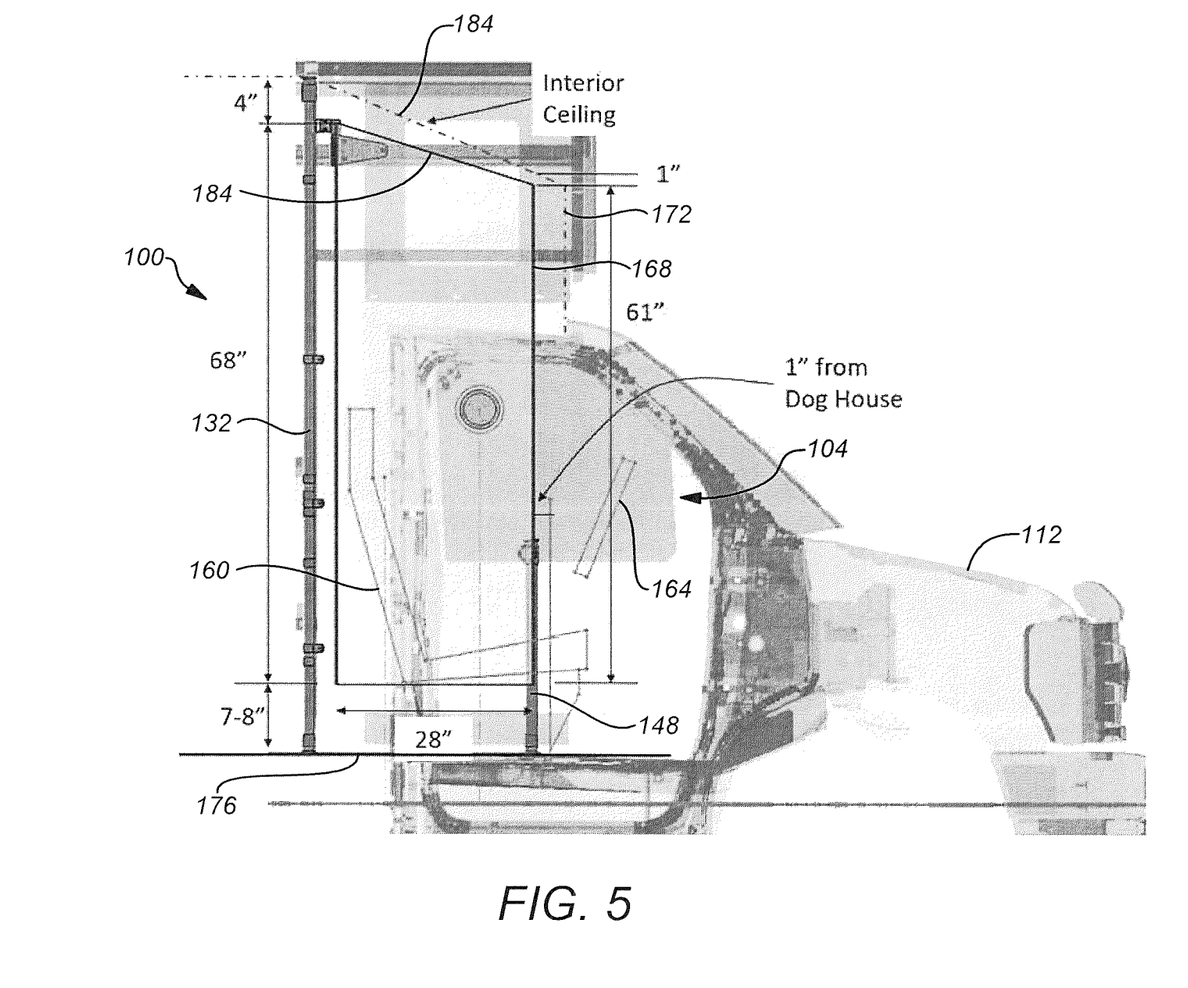
FIG. 5 illustrates a side ghost-view of a bus that includes an exemplary embodiment of a driver barrier that is installed to provide a protective shield around a driver cockpit.

FIG. 5 illustrates a side ghost-view of a bus 112 that includes an exemplary embodiment of the driver barrier 100 that is installed to provide a protective shield around a driver cockpit 104. As shown in FIG. 5, the driver cockpit 104 generally includes a driver's seat 160 and a steering wheel 164. The driver barrier 100 is shown in an aisle configuration, discussed with respect to FIG. 3B, and thus the driver barrier 100 shields the driver cockpit 104 during loading and unloading of passengers. Stanchions 132 are installed at a location rearward of the driver cockpit 104 that provides enough clearance to allow a door 116 comprising the driver barrier 100 to be placed into a stowed configuration behind the driver's seat 160, as discussed with respect to FIG. 3C. Further, the location of the stanchions 132 ensures that an edge 168 of the door 116 remains unobstructed by an interior wall 172 and an interior doghouse (not shown) of the bus 112. A doorstop 148 may be mounted onto a location of a floor 176 of the bus 112 and configured to support the door 116 in the aisle configuration during passenger loading. Further, the door 116 may include an angled top edge 180 configured to remain unobstructed by an interior ceiling 184 of the bus 112.

Figure 6A:
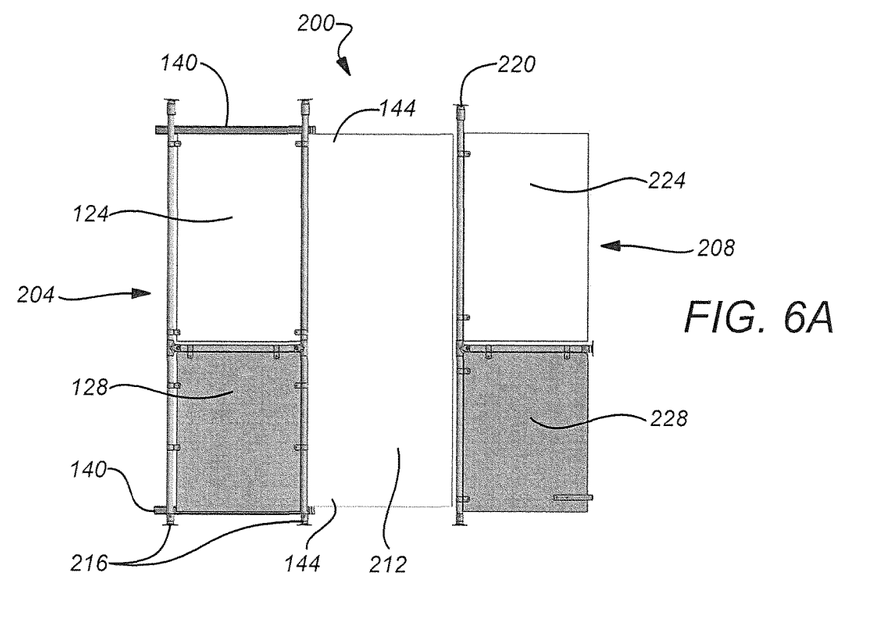
FIG. 6A illustrates a rear plan view of a close configuration of an exemplary embodiment of a full-face barrier that may be disposed between a driver cockpit and a seating area within a bus.
Figure 6B:
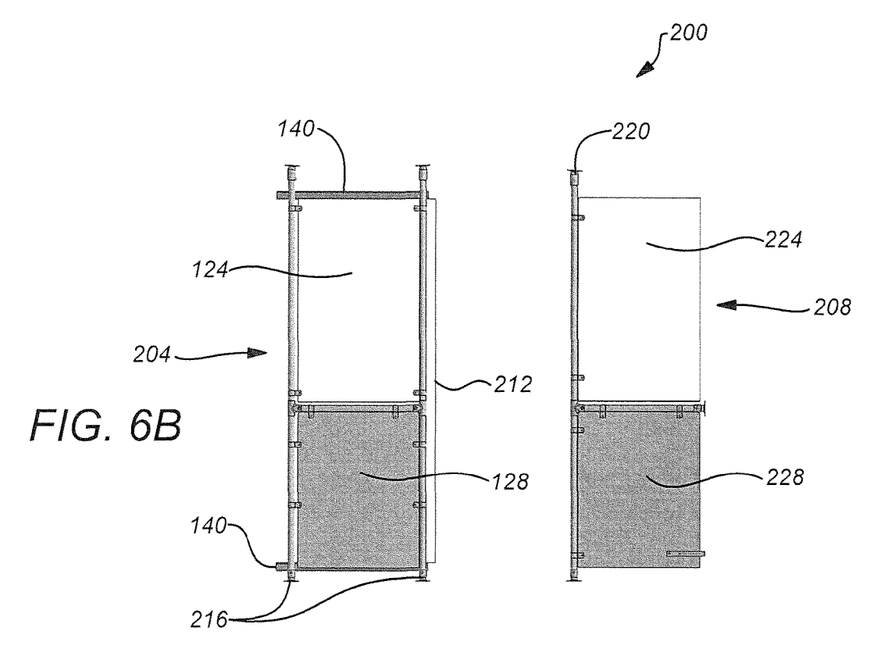
FIG. 6B illustrates the full-face barrier of FIG. 6A in an open configuration.

FIGS. 6A-6B illustrate a rear plan view of an exemplary embodiment of a full-face barrier 200 that may be disposed between a driver cockpit 104 and a seating area 108 within an exemplary bus 112 as discussed with respect to FIGS. 1-5. The full-face barrier 200 includes a driver side barrier 204 and a curbside barrier 208 with a sliding door 212 disposed therebetween. Driver side stanchions 216 may be mounted between a floor and ceiling of the bus 112 and are configured to support the driver side barrier 204 and sliding door 212. A curbside stanchion 220 may be similarly mounted between the floor and ceiling of the bus 112 and is configured to support the curbside barrier 208, as shown in FIGS. 6A-6B.

The driver side barrier 204 includes a fixed driver side barrier 124 and an opaque barrier 128 that may be fastened to the driver side stanchions 216. Any of various suitable fasteners may be used to fasten the driver side barrier 124 and the opaque barrier 128 to the stanchions 216. The driver side barrier 124 may be an optically transparent material, such as acrylic, polycarbonate, or other optically transparent material. Further, the driver side barrier 124 may be configured to prevent and/or discourage break-in attempts by occupants within the passenger seating area 108 that may use blunt-force instruments, such as sledgehammers, crowbars, knives, pickaxes, bricks, blocks, bats, and the like. In one embodiment, the driver side barrier 124 comprises a ⅜" thick polycarbonate panel. In another embodiment, the driver side barrier 124 comprises a ¼" acrylic panel. The opaque barrier 128 generally comprises a rigid material such as metal or hard plastic.

As shown in FIGS. 6A-6B, curbside barrier 208 includes a fixed barrier 224 and an opaque barrier 228 that may be fastened between the curbside stanchion 220 and a curbside wall of the bus 112 by way of any of various suitable fasteners. It is contemplated that the fixed barrier 224 is substantially the same as the fixed driver side barrier 124. As such, the fixed barrier 224 may be an optically transparent material, such as acrylic, polycarbonate, or other optically transparent material. Further, it is contemplated that the fixed barrier 224 may be configured to prevent and/or discourage break-in attempts by occupants within the passenger seating area 108 that may be using any of a sledgehammer, a crowbar, a knife, a pickaxe, a brick, a block, a bat, and the like. In one embodiment, the fixed barrier 224 comprises a ⅜" thick polycarbonate panel. In another embodiment, the fixed barrier 224 comprises a ¼" acrylic panel. Further, the opaque barrier 228 is substantially the same as the opaque barrier 128, and thus the opaque barrier 228 generally comprises a rigid material such as metal or hard plastic.

The sliding door 212 is configured to facilitate changing the full-face barrier 200 between a closed configuration, shown in FIG. 6A, and an open configuration, shown in FIG. 6B. In the closed configuration, the full-face barrier 200 provides a protective shield between the driver cockpit 104 and the seating area 108 of the bus 112. It is contemplated that the closed configuration of the full-face barrier 200 advantageously prevents passengers within the seating area 108 from accessing the driver cockpit 104, thereby protecting the driver from potential hijackers, burglars, rioters, looters, and the like. It is further contemplated that the closed configuration of the full-face barrier 200 inhibits the transfer of contagious aerosols arising within the seating area 108 from reaching the driver cockpit 104, thereby protecting the driver from contagious pathogens. In the open configuration, shown in FIG. 6B, the sliding door 212 is moved away from the curbside barrier 208 so as to allow passengers to enter and exit the seating area 108 of the bus 112. After the passengers have finished moving into and out of the seating area 108, the driver may slide the door 116 toward the curbside barrier 208 to place the full-face barrier 200 into the closed configuration of FIG. 6A before resuming operation of the bus 112.

The sliding door 212 generally comprises a transparent panel that may be mounted to the driver side stanchions 216 by way of sliders 140 and mounts 144. The sliding door 212 may be comprised of acrylic, polycarbonate, or any similar optically transparent material. Further, it is contemplated that the sliding door 212 may be configured to prevent and/or discourage break-in attempts by occupants within the passenger seating area 108 that may be using blunt-force instruments, such as sledgehammers, crowbars, knives, pickaxes, bricks, blocks, bats, and the like. In one embodiment, the sliding door 212 comprises a ⅜" thick polycarbonate panel. The sliders 140 are configured to facilitate moving the sliding door 212 between the closed configuration of FIG. 6A and the open configuration of FIG. 6B. Preferably, the sliders 140 are mounted horizontally between the stanchions 212, at a top of the driver side barrier 124 and at a bottom of the opaque barrier 128. As best shown in FIG. 4, each slider 140 generally comprises a seat track 152 that receives a slide block 156. The seat track 152 may be comprised of stainless steel and configured to allow the slide block 156 to slide along a length of the seat track 152. Thus, during opening the full-face barrier 200, the driver may slide the door 212 next to the driver side barrier 204 behind the driver cockpit 104.

It is contemplated that the sliders 140 are not to be limited to seat tracks 152 and slide blocks 156, as described in connection with FIG. 4, but rather the sliders 140 may comprise any of various slide configurations, such as, by way of non-limiting example, roller slides and ball bearing slides. It is further contemplated that the sliders 140 may include additional mechanisms configured to increase the functionality of the sliders 140, without limitation. For example, the sliders 140 may be configured to include hydraulic dampening components configured to prevent the sliding door 212 from slamming closed, thus reducing potential damage to the door 212. In some embodiments, the sliders 140 may include assistive mechanisms configured to automatically close or open the sliding door 212 through a portion of the distance between the driver side barrier 204 and the curbside barrier 208. Further, in some embodiments, the sliders 140 may be configured to hold the sliding door 212 opened or closed until a specific level of force is applied to the door 212. In some embodiments, the sliders 140 may be configured to keep the sliding door 212 locked opened or closed until a lever component (not shown) is released.

Moreover, in some embodiments, the sliding door 212 may include hinges 136, as discussed with respect to FIGS. 1-5, in addition to the sliders 140. In such embodiments, the hinges 136 facilitate rotating the sliding door 212 with respect to the driver side stanchions 216, allowing the driver to rotate the sliding door 212 from the closed configuration of FIG. 6A to an aisle configuration as shown in FIG. 3B. As described herein, the aisle configuration of the sliding door 212 cooperates with the driver side barrier 224 to isolate the driver from the seating area 108 during loading and unloading passengers. Once the passengers have finished moving into and out of the seating area 108, the driver may rotate the sliding door 212 into the closed configuration of FIG. 6A before resuming operation of the bus 112.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A driver barrier for isolating a public transit vehicle operator from a passenger seating area of a vehicle, the barrier comprising:
  a driver side barrier and an opaque barrier mounted behind a driver cockpit of the public transit vehicle;
  a door coupled with the driver side barrier and the opaque barrier for providing a barrier between the cockpit and the passenger seating area;
  the driver side barrier comprising a transparent material and one or more stanchions that support the door;

wherein the driver side barrier and the opaque barrier are fixedly coupled with the one or more stanchions; and wherein the door is coupled with the stanchions using a plurality of hinges and sliders, wherein each hinge is fastened onto the door using a mount configured to support the door without cracking a transparent material of the door.

2. The barrier of claim 1, wherein the driver side barrier and the opaque barrier provide a protective shield between the public transit operator and the passenger seating area.

3. The barrier of claim 1, wherein the driver side barrier enables the public transit operator to view the seating area as well as utilize a rearview mirror during operating the vehicle.

4. The barrier of claim 1, wherein the transparent material is optically transparent and is formed of one of acrylic and polycarbonate.

5. The barrier of claim 4, wherein the optically transparent material comprises a ⅜" thick polycarbonate panel.

6. The barrier of claim 4, wherein the optically transparent material comprises a ¼" acrylic panel.

7. The barrier of claim 1, wherein the opaque barrier comprises a rigid material such as metal or hard plastic.

8. The barrier of claim 1, wherein the hinges enable the door to rotate between an aisle configuration and a closed configuration that separates the driver cockpit from the passenger seating area.

9. The barrier of claim 8, wherein the aisle configuration of the door operates as a protective shield that separates the driver cockpit from an entryway of the public transit vehicle while passengers move into and out of the seating area and through the entryway.

10. The barrier of claim 9, wherein the sliders enable the door to slide between the closed configuration and a stowed configuration wherein the door may be positioned adjacently to the driver side barrier and the opaque barrier so as to provide free access between the seating area and the driver cockpit and the entryway.

11. The barrier of claim 1, further comprising a curbside stanchion mounted between a floor and a ceiling of the vehicle and supporting a curbside barrier that includes a fixed barrier and an opaque barrier fastened between the curbside stanchion and a curbside wall of the vehicle.

12. The barrier of claim 11, wherein the sliders enable the door to slide between a closed configuration and an open configuration wherein the door may be positioned adjacently to the driver side barrier and the opaque barrier so as to provide free access between the seating area and the driver cockpit and an entryway of the vehicle.

13. The barrier of claim 12, wherein the closed configuration comprises the door extending from the driver side barrier to the curbside barrier to provide a full-face protective shield between the driver cockpit and the entryway and the seating area.

14. A method for providing a driver barrier to a public transit vehicle, the method comprising:

fastening a driver side barrier and an opaque barrier to one or more stanchions behind a driver cockpit of the public transit vehicle;

mounting a first slider to the one or more stanchions at a top of the driver side barrier;

mounting a second slider to the one or more stanchions at a bottom of the opaque barrier;

configuring a door to extend from the driver side barrier and opaque barrier across an aisle of a passenger seating area of the public transit vehicle;

coupling the door with the first and second sliders by way of slide blocks fastened to a top and a bottom of the door;

fixedly coupling the driver side barrier and the opaque barrier with the one or more stanchions; and wherein the door is coupled with the stanchions using a plurality of hinges and sliders, wherein each hinge is fastened onto the door using a mount configured to support the door without cracking a transparent material of the door.

15. The method of claim 14, wherein coupling includes coupling the slide blocks with the hinges whereby the door may be rotated with respect to the first and second sliders, such that the door may be rotated between an aisle configuration and a closed configuration that separates the driver cockpit from the passenger seating area.

16. The method of claim 14, wherein fastening includes mounting a curbside stanchion between a floor and a ceiling of the vehicle and supporting a curbside barrier that includes a fixed barrier and an opaque barrier fastened between the curbside stanchion and a curbside wall of the vehicle.

17. The method of claim 14, wherein configuring the door includes configuring the door to slide between a closed configuration and an open configuration wherein the door may be positioned to provide free access between the seating area and an entryway of the vehicle.

* * * * *